United States Patent

Kang

[11] Patent Number: 6,008,671
[45] Date of Patent: Dec. 28, 1999

[54] CLOCK SIGNAL MONITORING APPARATUS

[75] Inventor: Ik-Gou Kang, Incheon, Rep. of Korea

[73] Assignee: Daewoo Telecom, Ltd., Incheon, Rep. of Korea

[21] Appl. No.: 08/954,727

[22] Filed: Oct. 20, 1997

[30] Foreign Application Priority Data

Dec. 31, 1996 [KR] Rep. of Korea ................ 96-81214

[51] Int. Cl.[6] .................................... H03K 17/296
[52] U.S. Cl. ........................ 327/20; 327/48; 377/20; 377/16
[58] Field of Search .................. 327/20, 18, 43, 327/49, 48; 377/20, 16, 55

[56] References Cited

U.S. PATENT DOCUMENTS 4,374,361  2/1983  Holden ........................ 327/20
4,379,993  4/1983  Holden ........................ 327/20
4,698,829  10/1987  Di Giulio ........................ 377/16

*Primary Examiner*—Timothy P. Callahan
*Assistant Examiner*—Eunja Shin
*Attorney, Agent, or Firm*—Pennie & Edmonds LLP

[57] ABSTRACT

An apparatus for monitoring a reference clock signal having a clock pulse train comprises a detecting block for counting pluses of a count clock signal to produce a count value and generate a count failure signal when the count value reaches a predetermined value, wherein the frequency of the count clock signal is larger than that of the reference clock signal; and a controlling block for generating a clear signal at every clock pulse of the reference clock signal to cleat the detecting block when the clear signal is inputted thereto.

5 Claims, 2 Drawing Sheets

CLOCK SIGNAL MONITORING APPARATUS

FIELD OF THE INVENTION

The present invention relates to a duplex bus; and, more particularly, to an apparatus for monitoring a bus clock signal.

BACKGROUND OF THE INVENTION

The use of an assembly of electrical conductors known as "bus" is common in electrical circuit designs. The bus transfers data and a bus clock signal synchronously; that is, the data transferred on the bus should be synchronized with the bus clock signal.

For highly reliable data transmission, a duplex bus system having two buses (one active bus through which data is currently being transferred and one stand-by bus for use when the active bus is in failure) is employed.

The bus clock signal of each bus of the duplex bus system is constantly monitored by a clock signal monitor and the data transfer will be switched to the stand-by bus when the active bus fails to transfer the bus clock signal properly. In other words, if the clock signal of the active bus does not supply pulses of a predetermined frequency, the data transfer will be made through the stand-by bus.

In a conventional clock failure detection scheme for a duplex bus, the failure of one clock signal is detected by using the other bus clock signal as a reference signal.

However, the conventional bus clock monitor cannot detect the failure of both bus clock signals occurring at the same time since there will be no reference signal working properly.

SUMMARY OF THE INVENTION

It is, therefore, a primary object of the present invention to provide an improved clock monitoring apparatus for use in a duplex bus.

In accordance with the present invention, there is provided an apparatus for monitoring a reference clock signal having a clock pulse train, the apparatus comprising:

a detecting block for counting pluses of a count clock signal to produce a count value and generate a count failure signal when the count value reaches a predetermined value, wherein the frequency of the count clock signal is larger than that of the reference clock signal; and a controlling block for generating a clear signal at every clock pulse of the reference clock signal to clear the detecting block when the clear signal is inputted thereto.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
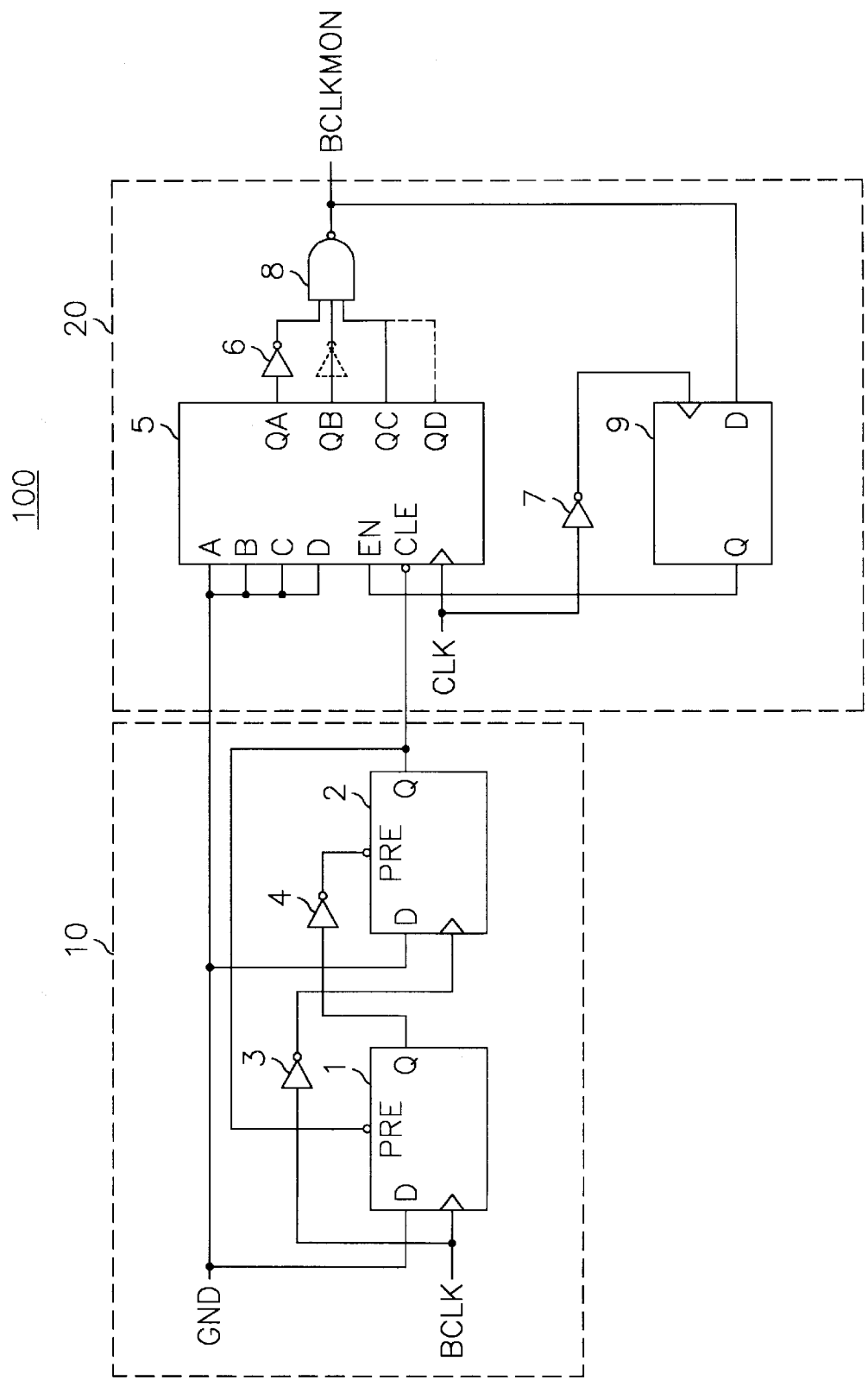
FIG. 1 presents a block diagram of a clock signal monitoring apparatus in accordance with the present invention.

Referring to FIG. 1, there is provided a block diagram of a clock signal monitoring apparatus 100 in accordance with the present invention, which comprises a counter control block 10 and a clock failure detection block 20.

The counter control block 10 includes two D flip-flops (F/F's) 1 and 2 and two inverters 3 and 4. A bus clock signal (BCLK) is applied to a clock input of the D F/F 1 and the inverter 3. Each D input of the D F/F's 1 and 2 is coupled with a ground (GND) voltage. The Q output of the D F/F 1 is inverted by the inverter 4 to be applied to a preset (PRE) input of the D F/F 2. The output of the inverter 3 is applied to a clock input of the D F/F 2. The Q output of the D F/F 2 is applied to a PRE input of the D F/F 1 and the clock failure detection block 20.

The clock failure detection block 20 includes a counter 5, two inverters 6 and 7, a NAND gate 8 and a D F/F 9. A clock (CLK) signal is applied to a clock input of the counter 5, wherein the frequency of the CLK signal is twice that of the BCLK signal. A, B, C, and D inputs of the counter 5 are coupled with the GND voltage. The Q output of the D F/F 2 of the counter control block 10 is applied to a clear (CLE) input of the counter 5. The Q output of the D F/F 9 is applied to an enable (EN) input of the counter 5. The QA output is applied to the inverter 6. The output of the inverter 6 is combined with the QB and the QC outputs of the counter 5 at the NAND gate 8 to generate a bus clock monitor (BCLKMON) signal. And the CLK signal is applied to the inverter 7. The output of the inverter 7 is applied to a clock input of the D F/F 9. The BCLKMON signal is applied to a D input of the D F/F 9.

Herein, the counter control block 10 is provided to periodically clear the counter 5 when the BCLK signal is inputted to the inventive apparatus 100 periodically. And the clock failure detection block 20 is provided to detect a clock failure when the counter 5 is not cleared periodically.

The D F/F 1 outputs from the Q output thereof the logic level applied to the D input thereof at a rising edge of the signal inputted the clock input thereof. When a logic level '0' signal is inputted to the PRE input of the D F/F 1, the D F/F 1 outputs a logic level '1' regardless of the D input thereof. Since the rest of the D F/F 2 and 9 are substantially identical to the D F/F 1, further explanation on their operation is omitted here for the sake of simplicity.

The counter 5 counts pulses of the CLK signal and outputs the count value by using four bits QA, QB, QC and QD when the logic level '1' signal is applied to the EN input thereof. When the logic level '0' signal is applied to the EN input of the counter 5, the counter 5 holds the count value. And the counter 5 outputs (0,0,0,0) at (QD, QC, QB, QA) regardless of the other inputs when the logic level '0' signal is applied to the CLE input thereof.

Hereinafter, the operation of the clock signal monitoring apparatus 100 will be described with reference to FIGS. 1 and 2.

Figure 2:
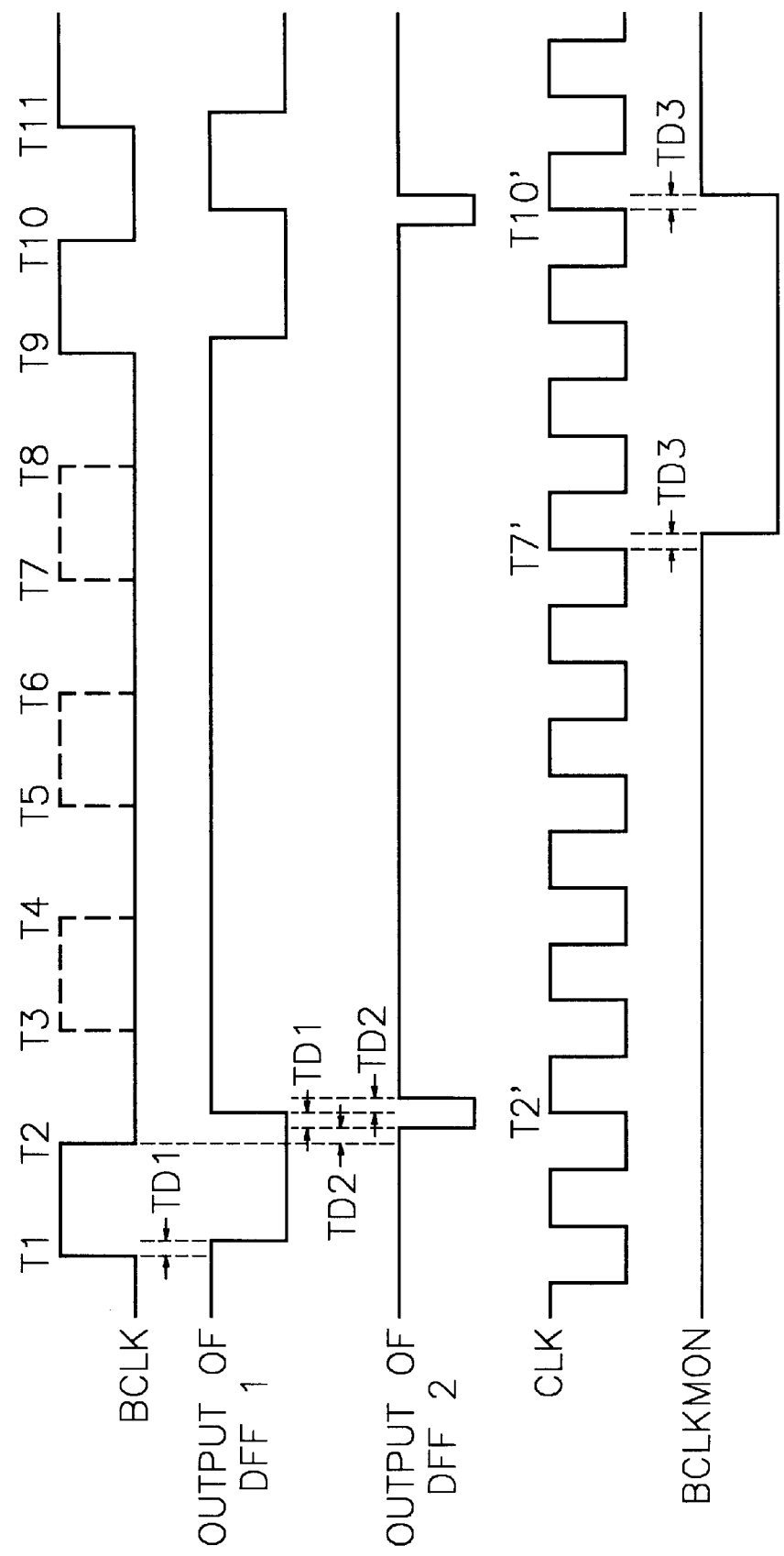
FIGS. 2 provides timing diagram for illustrating an operation of the clock signal monitoring apparatus in FIG. 1.

As shown in FIG. 2, at a rising edge T1 of the BCLK signal, a logic level '0' signal is issued to the D input of the D F/F 1. And the logic level '0' signal is outputted from the Q output of the D F/F 1 at T1+TD1, wherein the TD1 is a time delay at the D F/F 1. The logic level '0' signal of the Q output of the D F/F 1 is inverted by the inverter 4. The output of the inverter 4 is applied to the PRE input of the D F/F 2, whereby the Q output of the D F/F 2 is a logic level '1' signal.

At a falling edge T2 of the BCLK signal, the logic level '0' signal is issued to the D input of the D F/F 2. And the logic level '0' signal is outputted from the Q output of the D F/F 2 at T2+TD2, wherein the TD2 is a time delay at D F/F 2. The logic level '0' signal of the Q output of the D F/F 2 is inputted to the PRE input of the D F/F 1. And then, the logic level '1' signal is outputted from the Q output of the D F/F 1 at T2+TD2+TD1 and is inverted at the inverter 4.

The logic level '0' output of the inverter 4 is inputted to the PRE input of the D F/F 2, whereby the logic level '1' signal is outputted from the Q output of the D F/F 2 at T2+TD2+TD1+TD2.

As described above, the D F/F 2 outputs the logic level '0' signal whose width is the TD2+TD3 at every falling edge of the BCLK signal.

In FIG. 2, the CLK signal has its rising edge at T2' while the Q output of the D F/F 2 is the logic level '0'. Since the Q output of the D F/F 2 is inputted to the CLE input of the counter 5, the counter 5 is cleared at every falling edge of the BCLK signal.

The counter 5 counts the pulses of the CLK signal and outputs the count value by using four bits QA, QB, QC and QD. The inverted QA output is combined with the QB and the QC outputs at the NAND gate 8.

The NAND gate 8 applies the logic level '1' signal to the D input of the D F/F 9 till (QC, QB, QA) becomes (1,1,0), i.e., until the arrival of a rising edge T7' of the CLK signal in FIG. 2. When the (QC, QB, QA) is (1,1,0), the logic level '0' signal is outputted from the NAND gate 8 to D input of the D F/F 9 at T7'+TD3, wherein the TD3 is delay at the counter 5. Since the Q output of the D F/F 9 is inputted to the EN input of the counter 5 at rising edge T7' of the CLK signal, the counter value (1,1,0) remains same till the arrival of a rising edge T10' of the CLK signal when the counter 5 is cleared by the logic level '0' output of the D F/F 2.

In other words, the counter 5 increases the count value until the count value reaches a predetermined threshold value, e.g., (QC, QB, QA) becomes (1,1,0), while the logic level '1' signal is not inputted to the CLE input thereof. And the threshold value remains same till the counter 5 is cleared at T10'+TD3. Herein, the threshold value remains same while the BCLK signal remains to be the logic level '0' or '1' continuously.

Further, the threshold value is changed by controlling the number of the outputs combined at the NAND gate 8 and the number of the inverted outputs of the counter 5. In FIG. 1, the QD output is not inputted to the NAND gate 8 and only QA output is inverted before it is inputted to the NAND gate 8. In this embodiment, the clock failure detection block 20 detects BCLK signal failure that is longer than 5 periods of the CLK signal.

In order to detect BCLK signal failure more rapidly, another inverter, e.g., a dashed lined inverter between the QB output and the NAND gate 8 as shown in FIG. 1, may be inserted, whereby the clock failure detection block 20 detects a BCLK signal failure that is longer than 3 periods of the CLK signal. In order to detect BCLK signal failure more slowly, the QD output is inputted to the NAND gate 8 as shown by a dashed line in FIG. 1, whereby the clock failure detection block 20 detects a BCLK signal failure that is longer than 14 periods of the CLK signal.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus for monitoring a reference clock signal having a clock pulse train, comprising:
    a counter configured to count pulses of a count clock signal to produce a count value and generate a count failure signal when the count value reaches a predetermined value, wherein the frequency of the count clock signal is larger than that of the reference clock signal; and
    a controller comprising first and second flip-flops, said first flip-flop having an output connected to an input of the second flip-flop, and said second flip-flop having an output connected to an input of said counter, the output of the second flip-flop configured to output a clear signal at every clock pulse of the reference clock signal to clear the counter when the clear signal is inputted thereto, said count value reaching said predetermined value only if said clock pulse train is discontinued, thereby indicating a failure of said reference clock signal.

2. An apparatus for monitoring a reference clock signal having a clock pulse train, comprising:
    detecting means for counting pulses of a count clock signal to produce a count value and generate a count failure signal when the count value reaches a predetermined value, wherein the frequency of the count clock signal is larger than that of the reference clock signal; and
    controlling means for generating a clear signal at every clock pulse of the reference clock signal to clear the detecting means when the clear signal is inputted thereto, wherein the detecting means includes:
    counting means for updating the count value whenever the count clock signal is inputted;
    combining means for generating the count failure signal when the count value reaches a predetermined value;
    third inverting means for inverting the count clock signal; and
    third D flip-flop for inputting to the counting means the count failure signal synchronized with the output of the third inverting means, whereby the counting means holds the count value.

3. An apparatus for monitoring a reference clock signal having a clock pulse train, comprising:
    detecting means for counting pulses of a count clock signal to produce a count value and generate a count failure signal when the count value reaches a predetermined value, wherein the frequency of the count clock signal is larger than that of the reference clock signal; and
    controlling means for generating a clear signal at every clock pulse of the reference clock signal to clear the detecting means when the clear signal is inputted thereto, wherein the controlling means includes:
    first D flip-flop for outputting a logic level '0' signal synchronized with the reference clock signal when the clear signal is logic level '0' and a logic level '1' signal when the clear signal is logic level '1';
    first inverting means for inverting the reference clock signal;
    second inverting means for inverting the output of the first D flip-flop; and
    second D flip-flop for outputting as the clear signal the logic level '0' signal synchronized with the inverted reference clock signal when the output of the second inverting means is logic level '1' and the logic level '1' signal when the output of the second inverting means is logic level '0'.

4. The apparatus of claim 1, wherein the output of the second flip-flop is also connected to an input of the first flip-flop.

5. The apparatus of claim 4, wherein the reference clock signal is input to a clock input of both the first and second flip-flops.

* * * * *